United States Patent [19]

Kubek et al.

[11] Patent Number: 4,764,354
[45] Date of Patent: Aug. 16, 1988

[54] ALKANOLAMINE GAS TREATING PROCESS FOR A FEEDSTREAM CONTAINING HYDROGEN SULFIDE

[75] Inventors: Daniel J. Kubek, Greenburgh; John G. McCullough, Hawthorne; Kenneth J. Barr, Yonkers; Alexander J. Kosseim, Rye, all of N.Y.

[73] Assignee: Union Carbide Corporation, Danbury, Conn.

[21] Appl. No.: 10,819

[22] Filed: Feb. 4, 1987

[51] Int. Cl.$^4$ .............. C01B 17/16; C23F 11/04
[52] U.S. Cl. .................... 423/228; 423/229; 252/388; 252/389.54
[58] Field of Search .............. 423/228, 229; 252/388, 252/389.54, 390, 394, 395

[56] References Cited

U.S. PATENT DOCUMENTS

| | | | |
|---|---|---|---|
| 3,951,844 | 4/1976 | Mago | 252/389.54 |
| 4,502,979 | 3/1985 | McCullough et al. | 252/388 |
| 4,537,752 | 8/1985 | Weber | 423/228 |

Primary Examiner—Patrick P. Garvin
Assistant Examiner—George R. Fourson
Attorney, Agent, or Firm—E. Lieberstein

[57] ABSTRACT

In an alkanolamine gas treating process for removing acid gas from a feedstream in which hydrogen sulfide is present, reduced corrosion of steel parts or components is observed when solution concentrations of hydrogen sulfide and vanadium in the plus five valence state are maintained above certain minimum levels.

7 Claims, 5 Drawing Sheets

4,764,354

ALKANOLAMINE GAS TREATING PROCESS FOR A FEEDSTREAM CONTAINING HYDROGEN SULFIDE

This invention relates to an improved alkanolamine acid gas treating process for purifying a gaseous feedstream containing hydrogen sulfide ($H_2S$).

BACKGROUND OF THE INVENTION

Gases such as natural gas, refinery gases and synthesis gas have been purified by the utilization of aqueous alkanolamine solutions for the absorption of acid gases such as $CO_2$, $H_2S$, and COS contained in the gas stream. Ordinarily, a 10 percent to 30 percent by weight alkanolamine solution (e.g., a monoethanolamine solution), flowing countercurrently to the gas stream in an absorption column, is used to remove the acid gases. The process is a continuous and cyclic one which can be reversed at higher temperatures by desorbing the acid gases from the alkanolamine solution.

When steel parts or components are used in such a system, they are subject to both general and local corrosive attack. This is a particular problem in reboilers and heat exchangers where the steel is exposed to a hot, protonated alkanolamine solution. A heat transfering metal surface appears to be especially vulnerable. Previous investigations by others have revealed that under certain conditions, corrosive products such as aminoacetic; glycolic, oxalic, and formic acids were formed. The alkanolamine salts of these acids present the possibility of increased attack upon ferrous metals. Furthermore, the carbonate salt of monoethanolamine can be converted to additional products such as N-(2-hydroxyethyl)-ethylenediamine which has been found to increase the corrosiveness of the amine solution towards steel, particularly under heat transfer conditions.

There are various alternatives available in order to decrease corrosion rates, among them (1) the provision of a side-stream reclaimer to remove corrosive degradation products, (2) the employment of more corrosion resistant materials, (3) greater control of the process conditions, and (4) the inclusion of corrosion inhibitors. Various corrosion inhibitors have been formulated, as indicated by the examples given below, to purify a feedstream of acid gas based either on the presence or the absence of hydrogen sulfide in the feedstream.

A corrosion inhibiting composition for use with an aqueous alkanolamine solution to remove acid gases from a feedstream such as natural gas which does not contain any hydrogen sulfide is taught in U.S. Pat. No. 3,808,140. The corrosion inhibitor described in this patent is limited to a combination of vanadium compounds and antimony compounds and will not tolerate the presence of hydrogen sulfide.

A corrosion inhibiting composition for use with an aqueous alkanolamine solution to remove acid gases from a feedstream such as synthesis gas which contains hydrogen sulfide, is taught in U.S. Pat. No. 4,502,979. This patent discloses the synergistic combination of a nitro-substituted aromatic acid, or a nitro substituted acid salt, with a vanadium compound for providing corrosion inhibition in an alkanolamine gas treating system wherein at least a portion of the acid gas is hydrogen sulfide.

It has now been discovered that under certain process conditions the alkanolamine gas treating process will operate more effectively using vanadium compounds in the plus five valence state alone or in combination with other chemicals to inhibit corrosion in an acid gas feedstream with hydrogen sulfide present.

SUMMARY OF THE INVENTION

The present invention is directed to an improved alkanolamine acid gas treating process for removing acid gas from a feedstream in which hydrogen sulfide is present comprising the steps of contacting the feedstream with an aqueous alkanolamine solution in an absorption column to form an alkanolamine solution rich in acid gas containing hydrogen sulfide, regenerating an alkanolamine solution lean in acid gas from said rich solution for recycling through said absorption column and introducing a vanadium compound into said alkanolamine solution for inhibiting corrosion wherein the improvement comprises:

(a) maintaining a minimum level within a range of between about 0.003 to 0.02% $H_2S$ by weight in said alkanolamine solution; and (b) introducing a source of oxygen into said alkanolamine solution in a sufficient amount to maintain a minimum solution concentration within a range of between about 30 to 70 PPM vanadium in its plus five valence state throughout said acid gas treating operation.

Further advantages of the present invention will become apparent from the following detailed description when read in conjunction with the accompanying drawings of which:

DESCRIPTION OF THE INVENTION

Figure 1:
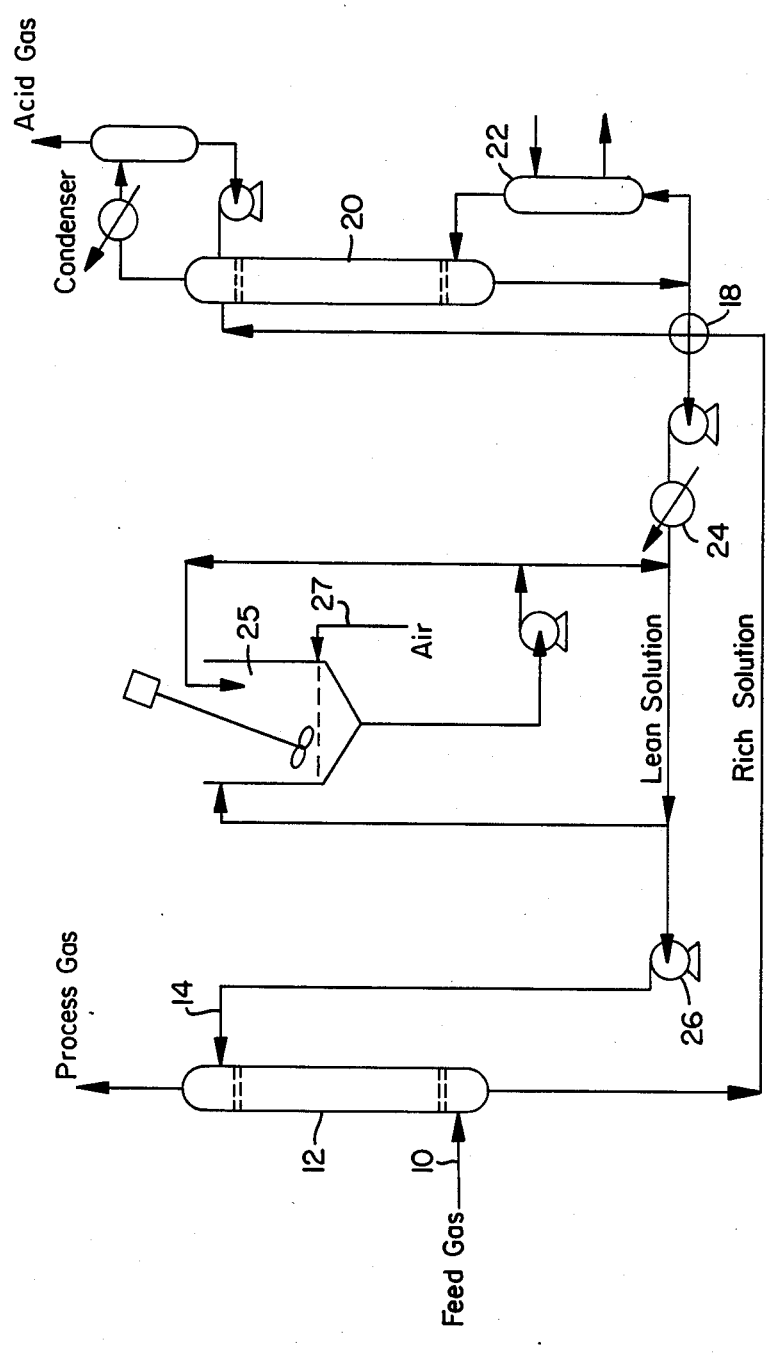
FIG. 1 is a schematic flow diagram illustrating the process of the present invention.

The feed gas is introduced along line 10 into the absorber column 12 at the bottom end thereof at an inlet temperature in a range of about 80° to 140° F. The feed gas contains process gas and acid gas. The process gas may consist of hydrocarbons, synthesis gas and nitrogen and hydrogen. The acid gas may consist of $CO_2$ and/or COS with at least some presence of hydrogen sulfide. A minimum level of $H_2S$, as will be discussed hereafter, is essential to the practice of the present invention. The concentration of acid gas in the feed gas is typically in the range of about 1 to about 30 percent by volume.

An aqueous alkanolamine solution, referred to hereafter as the lean solution, is fed through line 14 into the absorber column 12 so as to flow in a direction countercurrent to the direction of the feed gas. The alkanolamine solution contains water and a conventional alkanolamine solvent such as, for example, monoethanolamine (MEA), diethanolamine (DEA), triethanolamine (TEA) and methyldiethanolamine (MDEA).

The lean alkanolamine solution absorbs the acid gas from the feed gas and leaves the absorber column 12 as a "rich solution". By "rich solution" is meant an alkanolamine solution containing absorbed acid gas with a mole ratio of acid gas to alkanolamine solution of at least 0.1 to 1. The rich solution is fed from line 15 through a heat exchanger 18 into a stripper 20. The stripper 20 functions in a conventional manner to desorb the rich solution of acid gas at relatively high temperature and low pressure. The energy to desorb the rich solution is provided by a source of heat from reboiler 22. The steam generated at the bottom of stripper column 20 is directed countercurrently through the stripper 20 relative to the direction of flow of the rich solution.

The lean alkanolamine solution leaves the stripper 20 from the bottom end thereof at a relatively high temperature within a range of about 220° to 280° F. and passes through a heat exchanger 18 and cooler 24 for reducing the temperature of the solution to a relatively low temperature between about 100° to 140° F. The low temperature solution is then passed through a pump 26 for recycling the alkanolamine solution through the absorber column 12 to form a closed loop regeneration cycle.

A corrosion inhibiting composition is fed from an injection tank 25 into the low temperature lean alkanolamine solution before it is pumped into the absorber column 12. The corrosion inhibitor, in accordance with the present invention, consists of a vanadium compound to be used alone or in combination with other known organic compounds selected from the group consisting of nitro substituted aromatic acids, nitro substituted acid salts, 1,4-naphthoquinone as taught in U.S. Pat. No. 4,502,979 the disclosure of which is herein incorporated by reference.

Although the choice of the vanadium compound to be used as the inhibitor is not critical to the present invention once it is in solution, the concentration of vanadium in its pentavalent state i.e. the plus five valence state, has been found to be critical as will be explained hereafter in greater detail. The vanadium can be introduced as one or more of any of the following or similar inorganic compounds taken individually or in combination: , $V_2O_5$, $NaVO_3$, $Na_3VO_4$, $KVO_3$, $VOCl_3$, $VOSO_4$, $VO_2$ and $VOCl_2$.

The concentration level of vanadium in the plus five valence state is controlled by aeration of the solution such as by introducing air into the alkanolamine solution through line 27 into the injector tank 25. Alternatively, oxygen from any other source, such as by including it with the inlet feed gas stream, may be added to control the pentavalent state of the vanadium in the alkanolamine solution in accordance with the present invention. The rate of air flow should be controlled to maintain the concentration level of vanadium in the plus five valence state within a minimum level of between about 30 to 70 PPM. Too much air introduces an excess of oxidizing agent which will increase the oxidative degradation of the alkanolamine and will enhance corrosion.

Figure 2:
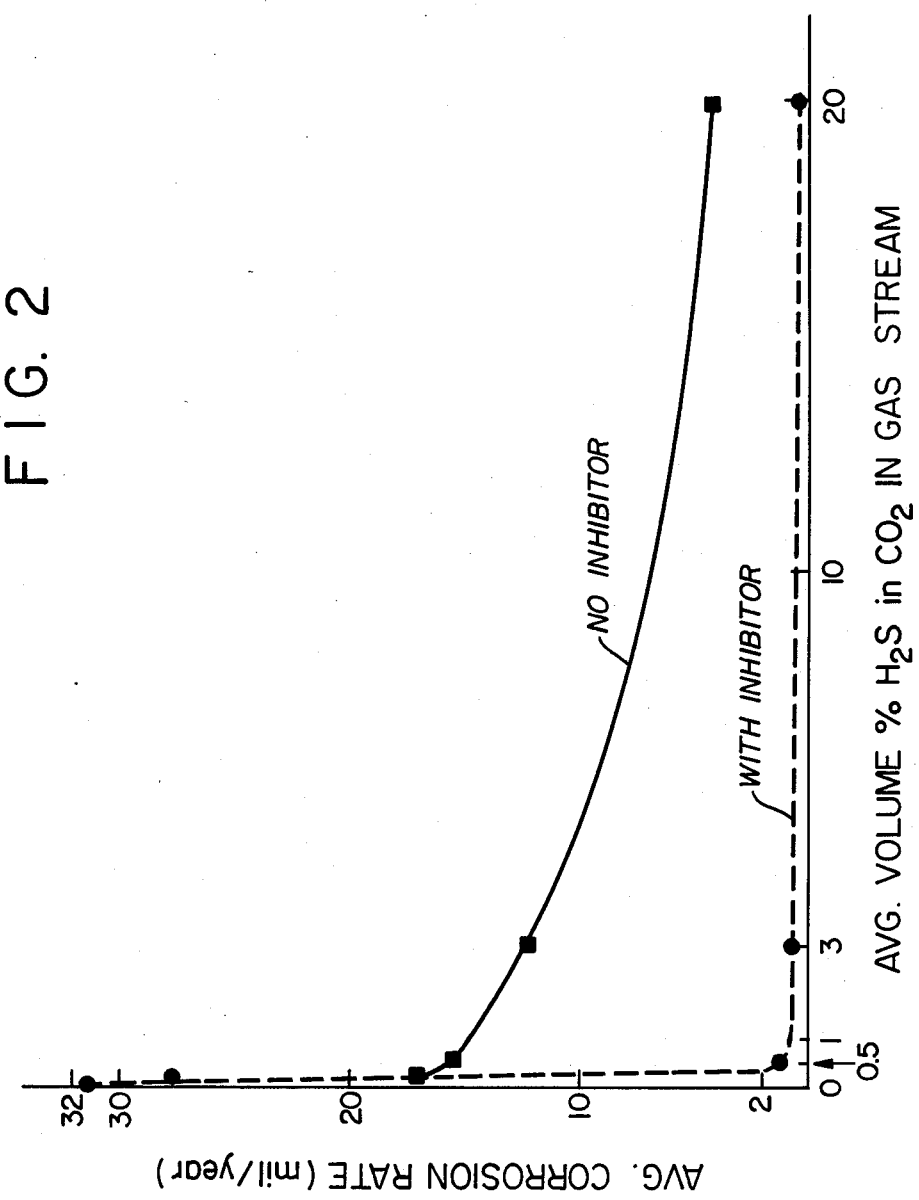
FIG. 2 is a graph showing the relationship of $H_2S$ in vol % in the gas upon the rate of corrosion under laboratory test conditions.

FIG. 2 demonstrates the effect of hydrogen sulfide on the average corrosion rate. The test data for the graph of FIG. 2 was taken using a 30 percent by weight monoethanolamine solution. A description of the heat transfer corrosion test procedure was conducted as follows:

A circular coupon of cold rolled mild steel about 3.5 inches in diameter and 1/32 inch thick was cleaned and weighed. The coupon was then clamped to a boro silicate glass corrosion cell so as to form the bottom surface of the cell. The corrosion cell was charged with alkanolamine solution saturated with carbon dioxide. Any residual air was purged from the cell with carbon dioxide. The steel coupon was made active by electrochemically reducing its air-formed passive film. By this method, active steel is prepared under an alkanolamine solution saturated with carbon dioxide with the careful exclusion of oxygen. A purging gas composed of carbon dioxide and hydrogen sulfide is now sparged through the solution. The corrosion cell is now ready to test the inhibition of hot active steel by heating the corrosion cell to reflux prior to introduction of the inhibitor being tested. At the end of the test period, the mixed hydrogen sulfide and carbon dioxide purge gas is replaced by carbon dioxide and the cell is permitted to cool. The steel coupon is cleaned of corrosion and the corrosion rate is then calculated.

The inhibitor used for the above test procedure was a combination of vanadium and p-nitrobenzoic acid following the teaching of U.S. Pat. No. 4,502,979. As is evident from the curve with the inhibitor in the system, there is a minimum level of hydrogen sulfide which must be present in the feed gas to assure a low corrosion rate. The minimum level shown in FIG. 2 was derived from laboratory data and supports the finding that a corresponding minimum $H_2S$ level must exist for full scale operation. The absolute minimum value of $H_2S$ required for full scale operation will vary from one plant to another. In the example shown in FIG. 2, the 30 wt. % monoethanolamine solution was sparged with 0.5% $H_2S$ in the gas stream, was analyzed and found to contain approximately 0.016 wt. % $H_2S$ in solution.

Figure 3:
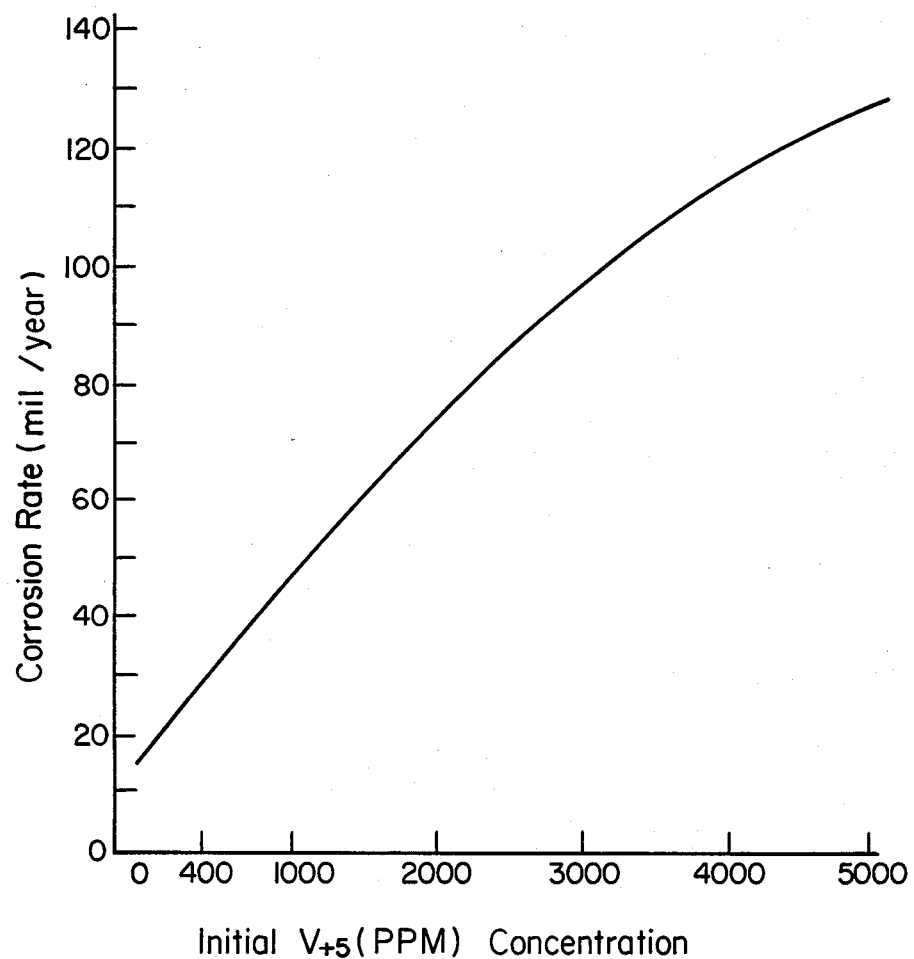
FIG. 3 is a graph showing the effect of vanadium in the plus five valence state on corrosion under laboratory test conditions using vanadium above as the corrosion inhibitor with a gas having essentially no $H_2S$ present (0.05 vol % $H_2S$ in gas stream)

FIG. 3 shows the relationship between the concentration of vanadium in the plus five valence state on the rate of corrosion for a gas with essentially no hydrogen sulfide present. From FIG. 3, one can postulate that unless sufficient hydrogen sulfide is present in solution, the corrosion rate increases with increasing concentrations of vanadium. The test data for the curve of FIG. 3 was taken with a gas composition of 0.05% $H_2S$, balance $CO_2$. A 30 wt. % DEA solution from an actual operating plant was used for this test and the laboratory procedure was similar to that previously described in connection with FIG. 2. Only vanadium was used in this series of tests.

Figure 4:
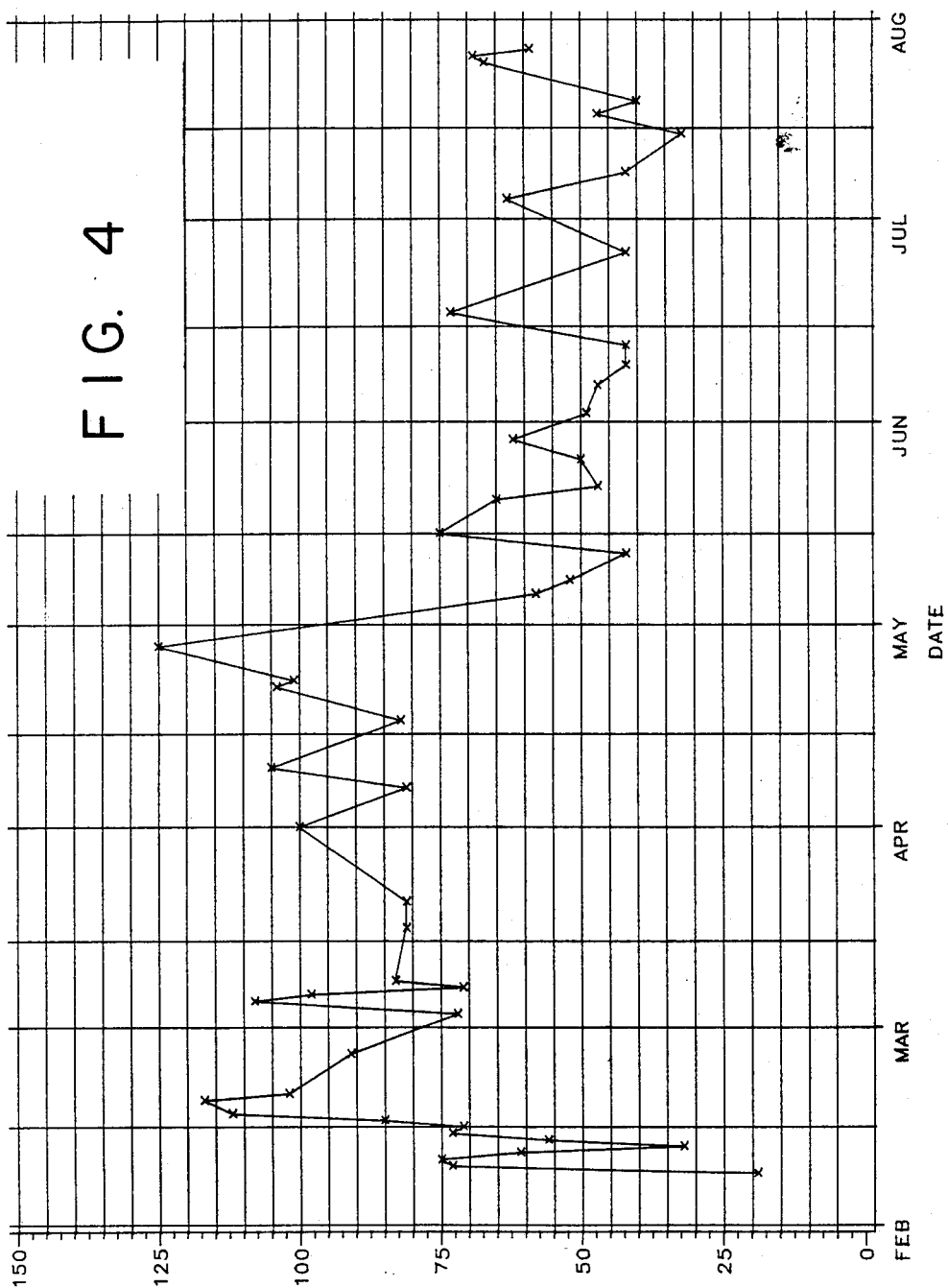
FIG. 4 is a graph showing how the concentration of vanadium in the plus five valence state varies over a given time period in a conventional alkanolamine acid gas treating process with a feed gas having a relatively high concentration of $H_2S$.
Figure 5:
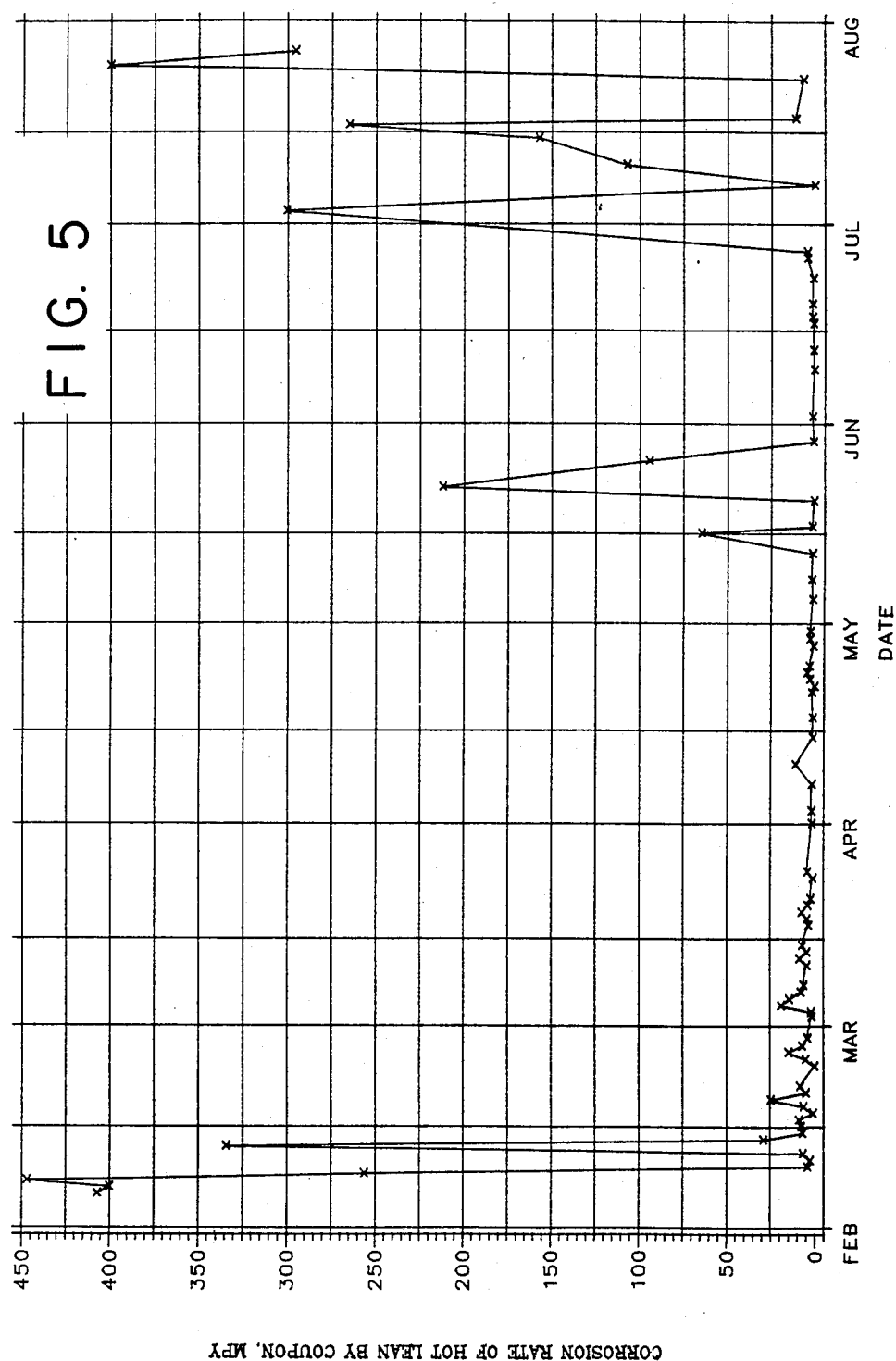
FIG. 5 is a graph similar to FIG. 4 showing the effect on corrosion at the levels of pentavalent vanadium corresponding to FIG. 4A.

When the lean alkanolamine solution contains an effective presence of hydrogen sulfide the level of vanadium in the plus five valence state also significantly affects the rate of corrosion as is evident from FIGS. 4 and 5. This data was taken from a full scale acid gas treating plant conforming in operation to the schematic of FIG. 1 using a 30-50% by weight DEA solution with an inhibitor of vanadium and p-nitrobenzoic acid. The inlet feed gas composition was approximately 1.5% $H_2S$, 12% $CO_2$, balance hydrocarbons. FIG. 4 shows the vanadium pentavalent ion concentration in the lean alkanolamine solution over a limited period of time with the variation in corrosion rate for the same period of time shown in FIG. 5. The corrosion rate was minimized to an acceptable low level of below 10 MPY by maintaining the vanadium pentavalent concentration above an acceptable minimum level within a range of between about 30 to 70 PPM. The vanadium concentration was analyzed by taking anaerobic samples from the lean alkanolamine solution and evaluating them in a conventional manner. The inhibitor tank 25 was aerated with a rate of air flow sufficient to increase the level of the vanadium pentavalent ion to above a value within a minimum range of between about 30 to 70 PPM. Below this range, including instantaneous deviations within the range, spikes in corrosion occur as can be seen in FIGS. 4 and 5. However, when the vanadium pentavalent level is restored to above an acceptable minimum level, corrosion spikes can be prevented.

The following Table I indicates test data for the above plant operation over a ten day period to determine average conditions of relatively corrosion free operation in the presence of hydrogen sulfide in solution and an acceptable level of vanadium in the pentavalent state:

TABLE I

| Date (1986) | 9/30 | 10/1 | 10/2 | 10/3 | 10/4 | 10/5 | 10/6 | 10/7 | 10/8 | 10/9 | Avg. |
|---|---|---|---|---|---|---|---|---|---|---|---|
| Corrosion Rate (Mil/Yr.) | 5.8 | 7 | 3.2 | 4.3 | 1.2 | 4.2 | 1.8 | 4.2 | 2.0 | 11.1 | 4.5 |
| Total V (PPM) | 693 | | | | 733 | | | | 586 | | 671 |
| V + 5 Lean Solution (PPM) | 67 | 77 | 55 | 76 | 80 | 75 | 71 | 114 | 184 | 48 | 85 |
| Lean Solution Analysis | | | | | | | | | | | |
| DEA, wt % | 31.8 | 31.3 | 31.7 | 30.2 | 30.4 | 30.2 | 29.8 | — | 30.4 | 25.7 | 30.2 |
| H$_2$S (grain/gal) | 7 | 10 | 8 | 4 | 10 | 10 | 11 | — | 1.5 | 8 | 7.7 |
| Wt. % H$_2$S | 0.011 | 0.016 | .013 | .0065 | .016 | .016 | .018 | — | .003 | .013 | .013 |

This data show examples of low corrosion rates corresponding to satisfactory levels of vanadium in plus five valence state, and an average solution concentration of 0.013 wt. % H$_2$S.

What is claimed is:

1. In an improved alkanolamine acid gas treating process for removing acid gas from a feedstream in which hydrogen sulfide is present comprising the steps of contacting the feedstream with an aqueous alkanolamine solution in an absorption column to form an alkanolamine solution rich in acid gas containing hydrogen sulfide, regenerating an alkanolamine solution lean in acid gas from said rich solution for recycling through said absorption column and introducing a vanadium compound into said alkanolamine solution for inhibiting corrosion wherein the improvement comprises:

(a) maintaining a minimum solution concentration of H$_2$S within a range of between about 0.003 to 0.02% by weight in said lean alkanolamine solution; and (b) introducing a source of oxygen into said lean alkanolamine solution in a sufficient amount to maintain a minimum solution concentration within a range of between about 30 to 70 PPM vanadium in its plus five valence state throughout said acid gas treating operation.

2. In an alkanolamine acid gas treating process as defined in claim 1 wherein said source of oxygen is supplied by aeration of said alkanolamine solution.

3. In an alkanolamine acid gas treating process as defined in claim 1 wherein said source of oxygen is supplied with the feed gas.

4. In an alkanolamine acid gas treating process as defined in claim 2 further comprising monitoring the plus five valence state of vanadium in solution and varying the rate of air flow into the alkanolamine solution to maintain a minimum level of vanadium in the plus five valence state within a range of between about 30 to 70 PPM.

5. In an alkanolamine acid gas treating process as defined in claim 3 or 4 wherein said vanadium compound is an inorganic vanadium compound.

6. In an alkanolamine acid gas treating process as defined in claim 5 wherein an organic compound is added in combination with said inorganic vanadium compound to inhibit corrosion with said organic compound being selected from the group consisting of nitro-substituted aromatic acids, nitro substituted aromatic acid salts and mixtures thereof.

7. In an alkanolamine acid gas treating process as defined in claim 6 wherein the vanadium compound is selected from the group consisting of V$_2$O$_5$, NaVO$_3$, KVO$_3$, NH$_4$VO$_3$, VOCl$_3$ and mixtures thereof.

* * * * *